United States Patent [19]
Penning et al.

[11] Patent Number: 5,717,740
[45] Date of Patent: Feb. 10, 1998

[54] TELEPHONE STATION ACCOUNT NUMBER DIALING DEVICE AND METHOD

[75] Inventors: Randall J. Penning, Middletown; Michael D. Porter, Flanders, both of N.J.

[73] Assignee: Lucent Technologies Inc., Murray Hill, N.J.

[21] Appl. No.: 579,517

[22] Filed: Dec. 27, 1995

[51] Int. Cl.$^6$ .................................................. H04M 1/64
[52] U.S. Cl. .............................. 379/67; 379/356; 379/355
[58] Field of Search ............................ 379/67, 68, 88, 379/89, 355, 356

[56] References Cited

U.S. PATENT DOCUMENTS

| | | | |
|---|---|---|---|
| 4,961,212 | 10/1990 | Marui et al. | 379/88 |
| 5,305,372 | 4/1994 | Tomiyori | 379/355 |
| 5,436,961 | 7/1995 | Kobayashi | 379/67 |
| 5,485,513 | 1/1996 | Goedken et al. | 379/355 |
| 5,528,680 | 6/1996 | Karpicke | 379/67 |

OTHER PUBLICATIONS

"Your Wildfire Electronic Assistant," Wildfire Communications, Inc., Lexington, Massachusetts, 1995.

*Primary Examiner*—Fan Tsang
*Attorney, Agent, or Firm*—Christopher N. Malvone

[57] ABSTRACT

The invention provides an account number dialing device for a telephone station for calling a remote party by dialing an account number and a telephone number in response to a plurality of inputs received from a user. The account number dialing device includes a user interface device, a directory memory and a controller. The controller is coupled to the directory memory and the user interface device. The controller forms a number using a plurality of numbers fetched from the directory memory in response to the plurality of inputs received from the user through the user interface device and files the number. Each of the plurality of numbers is fetched from the directory memory in response to one of the plurality of inputs from the user.

23 Claims, 4 Drawing Sheets

TELEPHONE STATION ACCOUNT NUMBER DIALING DEVICE AND METHOD

BACKGROUND OF THE INVENTION

1. Field of the Invention

This invention relates to a device and method for dialing an account number with a telephone number for a telephone station.

2. Description of Related Art

Modern telephone stations include many useful features to assist a user to remember and organize telephone information. For example, a directory memory feature stores a large number of directory entries including information such as names, corresponding telephone numbers, account numbers, and so on. However, telephone stations fail to fully utilize these advanced features. For example, current telephone stations do not dial an account number with a telephone number even though the account number is stored in the directory memory and can be recalled from the directory memory.

SUMMARY OF THE INVENTION

The invention provides an account number dialing device for a telephone station for calling a remote party by dialing an account number and a telephone number in response to a plurality of inputs received from a user. The account number dialing device includes a user interface device, a directory memory and a controller. The controller is coupled to the directory memory and the user interface device. The controller forms a number using a plurality of numbers fetched from the directory memory in response to the plurality of inputs received from the user through the user interface device and dials the number. Each of the plurality of numbers is fetched from the directory memory in response to one of the plurality of inputs from the user.

If a first input of the plurality of inputs is an account name of an account to be charged, then the controller fetches the account number from the directory memory. If a second input of the plurality of inputs is a name of a remote party to be called, then the controller fetches the telephone number from the directory memory. The controller forms the number using the account number, the telephone number and control codes. The control codes invoke accounting features of a switch connected to the telephone station.

The invention also provides a method for a telephone station to call a remote party by dialing the account number and the telephone number in response to the plurality of inputs received from the user. The method includes receiving a plurality of inputs from a user through the user interface device, fetching a plurality of numbers from a directory memory in response to the plurality of numbers received from the user, forming a number using the plurality of numbers fetched from the directory memory and dialing the number.

BRIEF DESCRIPTION OF THE DRAWINGS

The invention will be described in detail with reference to the following drawings, wherein like numerals represent like elements and.

DETAILED DESCRIPTION OF PREFERRED EMBODIMENTS

Figure 1:
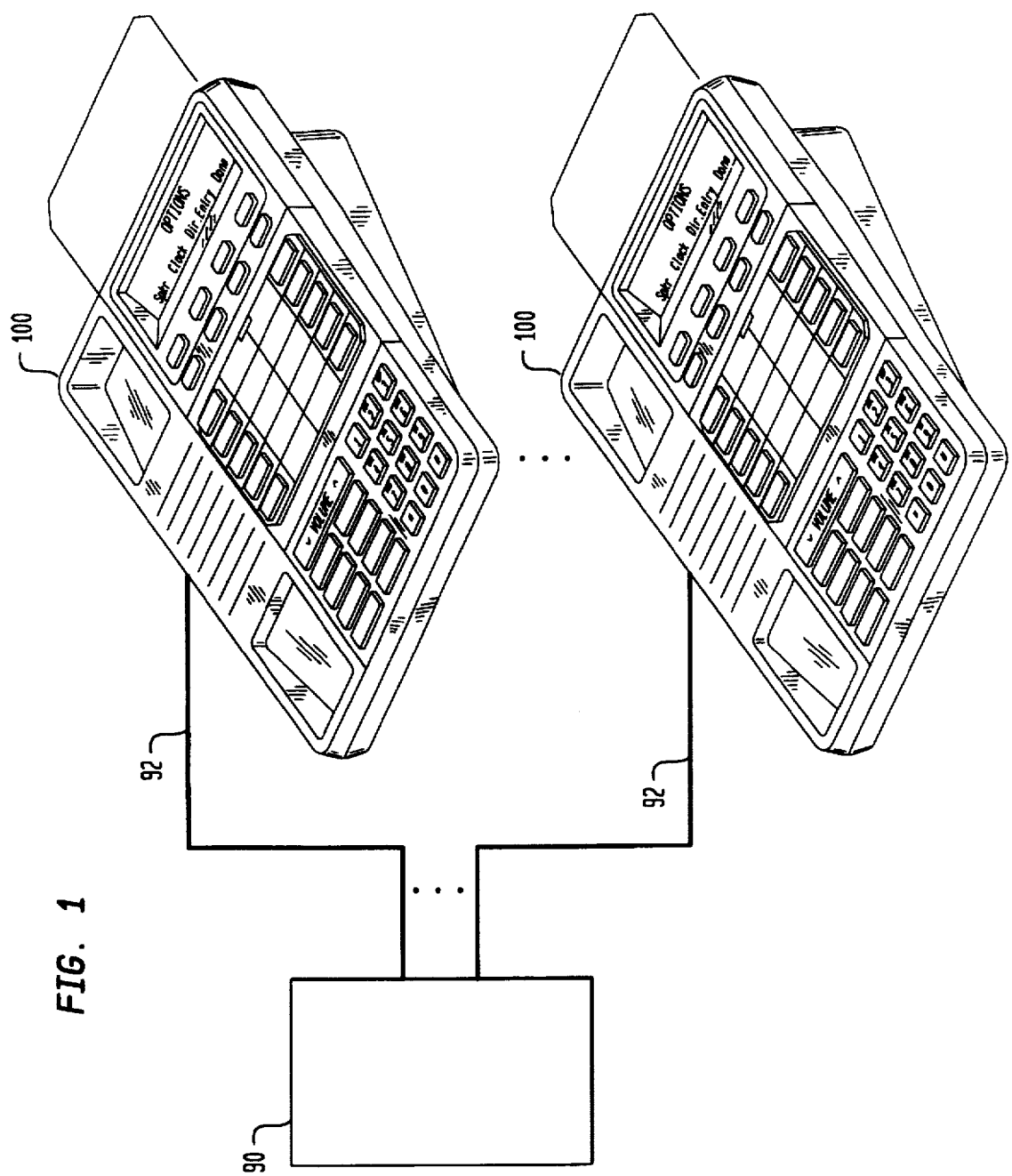
FIG. 1 is a block diagram of a plurality of telephone stations connected to a central switch.

FIG. 1 shows a block diagram including a plurality of telephone stations 100 connected to a central switch 90, such as a private branch exchange (PBX). The telephone stations 100 are connected to a central switch 90 through signal lines 92. Each of the signal lines 92 includes one bearer channel. The signal lines 92 may also include a signaling channel. The bearer channel carries digital or analog audio and/or application level data while the signaling channel carries inter-processor data. If the telephone station 100 is analog, separate bearer and signaling channels are not required.

Figure 2:
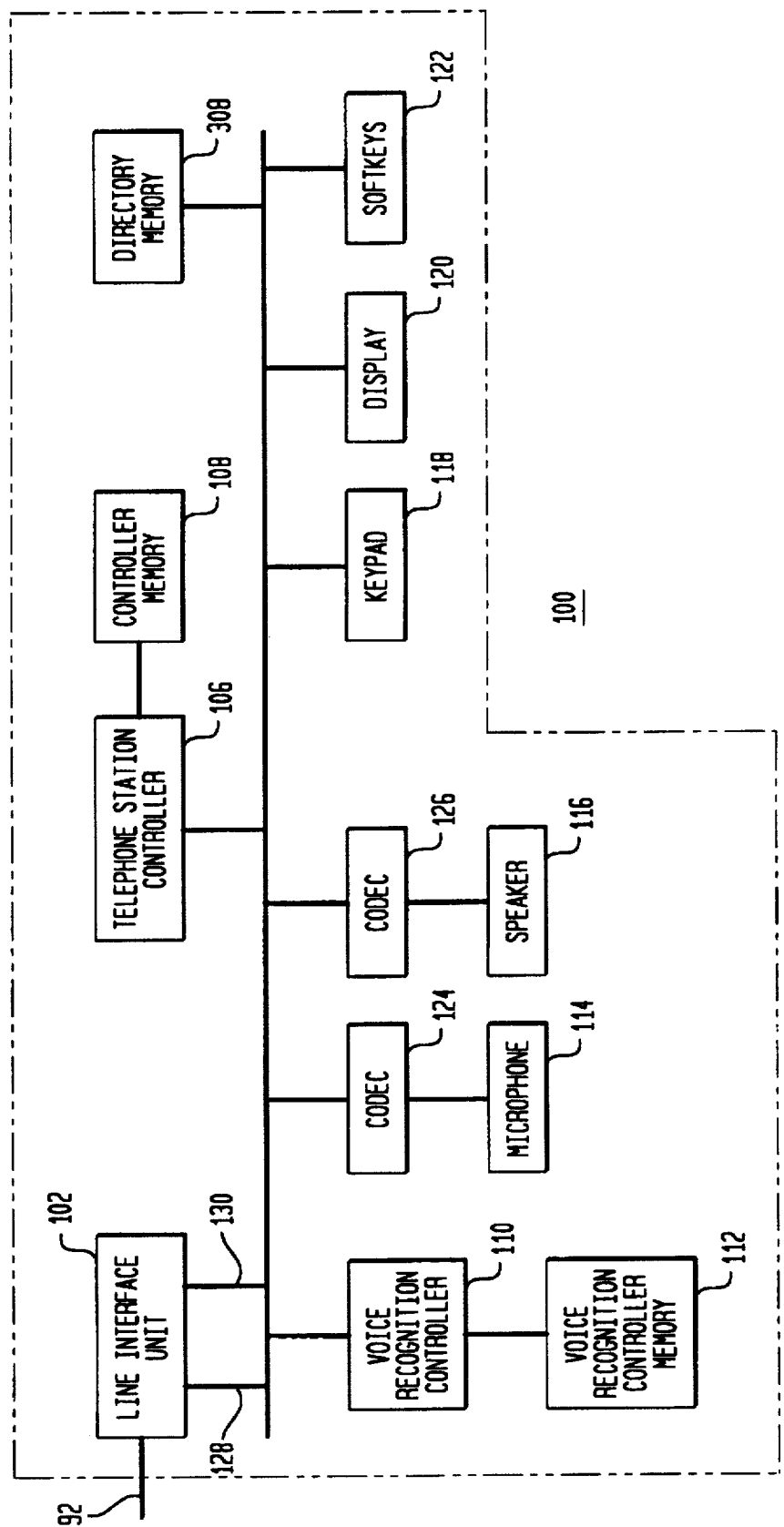
FIG. 2 is a block diagram of a telephone station.

FIG. 2 shows a block diagram of the telephone station 100. The signal line 92 is input to the line interface unit 102. The line interface unit 102 converts the signal line 92 into one or more bearer channels 128 and a signaling channel 130. The signaling channel 130 contains information indicating that a remote caller has dialed the telephone station 100. The telephone station controller 106 scans the data on the signaling channel 130 through signal line 132. The signal line 132 interconnects the components of the telephone station 100 together.

The voice recognition controller 110 connected to the signal line 132 also scans the signaling channel 130. When the voice recognition controller 110 detects special codes on the signaling channel 130, it accesses the bearer channel 128 and communicates with the remote caller by outputting audio voice data and receiving audio voice commands from the remote caller.

Since the voice recognition controller 110 and the telephone station controller 106 can both interface directly with the bearer channel 128, two bearer channels 128 may be provided so that the voice recognition controller 110 and the telephone station controller 106 can both communicate through the two bearer channels 128 at the same time.

The telephone station controller 106 and the voice recognition controller 110 operate concurrently. However, if only one bearer channel 128 is available, then the telephone station controller 106 and the voice recognition controller 110 cannot both communicate through the single bearer channel 128. Thus, having two bearer channels 128 allows both the telephone station controller 106 and the voice recognition controller 110 to simultaneously communicate through the two bearer channels 128.

The voice recognition controller 110 and the telephone station controller 106 interface with a user at the telephone station 100 through user interfaces such as a microphone 114, a speaker 116, a keypad 118, a display device 120, and soft keys 122. These user interfaces are coupled to the signal line 132. The microphone 114 and the speaker 116 are connected to the signal line 132 through two CODEC (Coder Decoder) units 124 and 126, respectively.

If the telephone station controller 106 requires additional information to be entered by the user, the telephone station controller 106 speaks through the speaker 116 to inform the user of the required information. The telephone station controller 106 may also request additional information from the user by displaying a request on the display device 120 in addition to speaking through the speaker 116. The user responds through the keypad 118 to enter the required data or simply talks to the telephone station controller 106 through the microphone 114.

The telephone station controller 106 also uses the display device 120 to indicate choices that the user may select. When options are displayed on the display device 120, the locations of the options are placed in a corresponding relationship with the soft keys 122. The user selects the displayed option by pushing a corresponding soft key 122.

Figure 3:
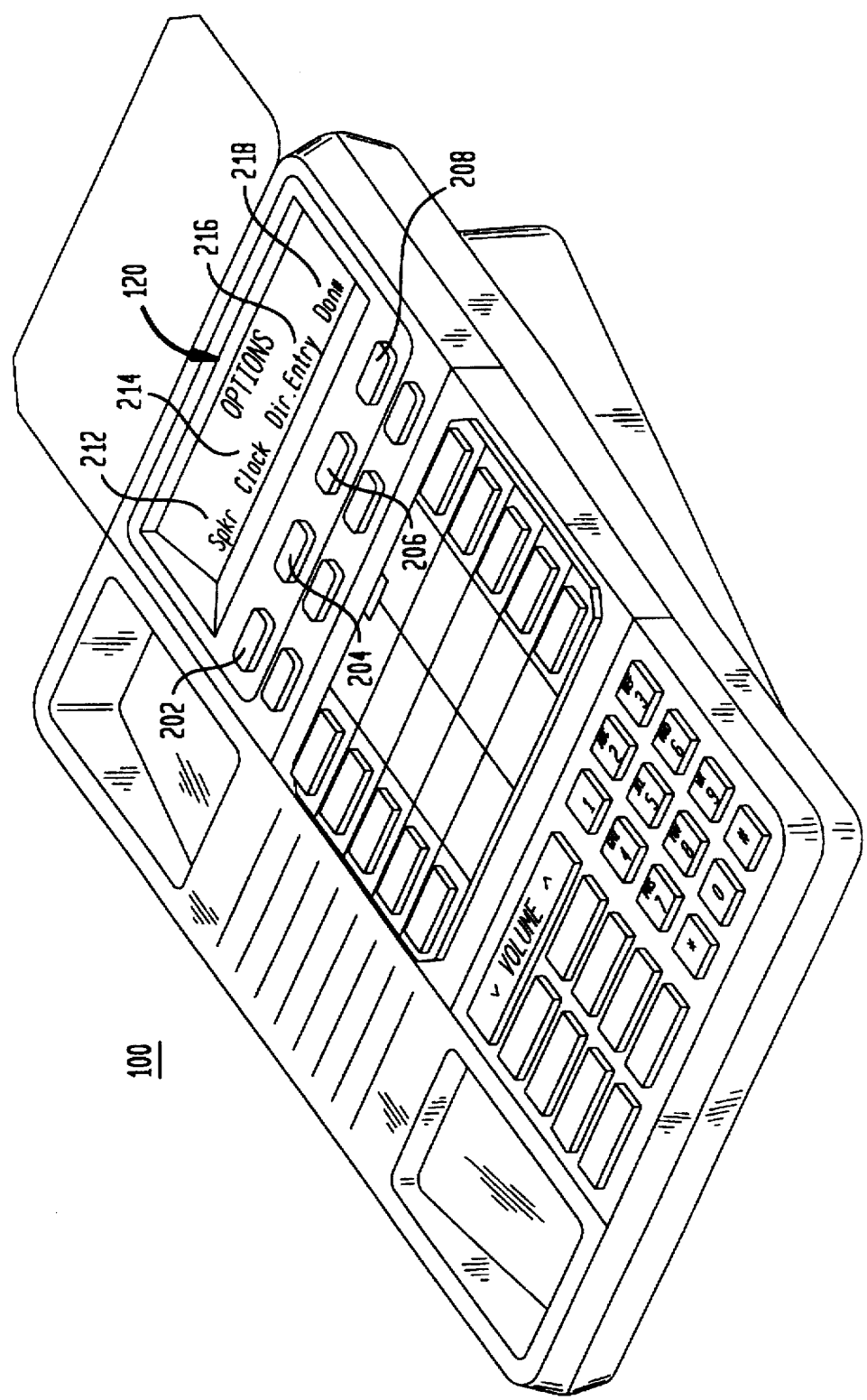
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202–208.

The user activates an account number dialing feature of the telephone station 100 by pushing one of the keys of the keypad 118 or by pushing one of the softkeys when the account number dialing feature is displayed as an option on the display device 120. The user can also activate the account number dialing feature by simply speaking an account number voice command, an account name or a name of a remote party into the microphone 114.

When the account number dialing feature is activated by any of the above methods, the telephone station controller 106 first determines if the account number dialing feature is explicitly activated by pushing a key of the keypad 118 or a softkey 122 or by the account number voice command. If the user explicitly activates the account number dialing feature, the telephone station controller 106 outputs a first request to the user to speak a name into the microphone 114. The name can be either an account name or the name of a remote party to be called. When the user speaks the name either in response to the first request or when first speaking to the telephone station controller 106 to implicitly activate the account number dialing feature, the microphone 114 generates a voice print corresponding to the name. The telephone station controller 106 searches the directory memory 308 for a directory entry that contains a voice print that matches the voice print generated by the microphone 114.

When a match is found, the telephone station controller 106 accesses the numbers in the directory entry. If the directory entry does not contain a telephone number but only contains an account number, the telephone station controller 106 determines that the name spoken by the user is an account name. If the name is an account name, the telephone station controller 106 outputs a second request to the user to enter either the name of the remote party to be called or the telephone number of the remote party to be called.

If the user speaks the name of the remote party to be called into the microphone 114, the telephone station controller 106 searches for a directory entry of the directory memory 308 having a voice print that matches the voice print generated by the microphone 114. When a match is found, the telephone station controller 106 fetches a telephone number of the remote party and forms a number using the account number and the telephone number of the remote party together with control codes to activate switch features of the central switch 90 connected to the telephone station 100. The telephone station controller 106 dials the number and the central switch 90 charges the call to the account number.

If the user dials the telephone number of the remote party instead of speaking the name of the remote caller into the microphone 114, the telephone station controller 106 receives the telephone number from the keypad 118 and dials the telephone number, the account number and the control codes to call the remote party.

If, in response to the first request, the name spoken by the user is a name of the remote party, the telephone station controller 106 fetches the telephone number of the remote party from a corresponding directory entry in the directory memory 308. If the corresponding directory entry also contains an account number, the telephone station controller 106 also fetches the account number and dials the telephone number, the account number and the control codes to call the remote party.

Figure 4:
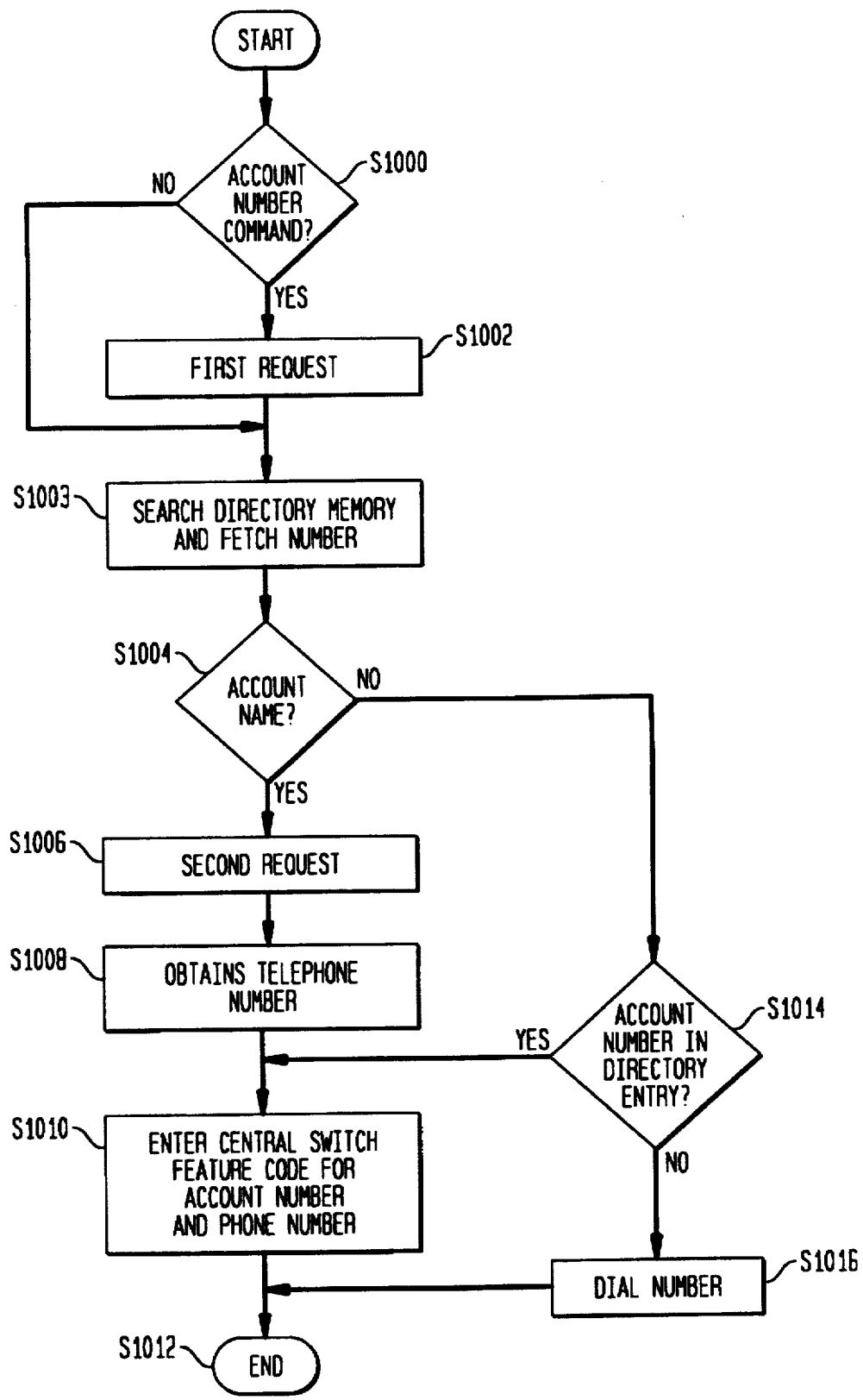
FIG. 4 is a flowchart of a telephone station account number dialing process.

FIG. 4 is a flowchart of the account number voice command process. In step S1000, the telephone station controller 106 determines whether the account number dial feature has been explicitly activated by either pushing a key on the keypad 118 or a softkey 122 or by the account number voice command. If the account number dialing feature is explicitly activated, the telephone station controller 106 goes to step S1002. Otherwise, the telephone station controller 106 receives the voice print generated by the microphone 114 and goes to step S1003. In step S1002, the telephone station controller 106 outputs a first request to the user to enter either the account name or the name of the remote party to be called by speaking into the microphone 114. Then, the telephone station controller 106 goes to step S1003.

In step S1003, the telephone station controller 106 searches the directory memory 308 for a directory entry that contains a voice print that matches the voice print entered by the user. When a match is found, the telephone station controller 106 fetches the number in the directory entry and then goes to step S1004. In step S1004, the telephone station controller 106 determines whether a telephone number is found in the directory entry. If the telephone number is not found in the directory entry, then the name spoken by the user in step S1002 is an account name and the telephone station controller 106 goes to step S1006. Otherwise, the telephone station controller 106 goes to step S1014.

In step S1006, the telephone station controller 106 outputs a second request to the user either to speak the name of the remote party or to dial the number of the remote party using the keypad 118. Then, the telephone station controller 106 goes to step S1008.

In step S1008, the telephone station controller 106 obtains a telephone number of the remote party. If the user spoke the name of the remote party into the microphone 114, the telephone station controller 106 searches the directory memory 308 for a directory entry containing a voice print that matches the voice print generated by the microphone 114. If the user entered a telephone number through the keypad 118, then the telephone station controller 106 receives the telephone number from the keypad 118. After the telephone number of the remote party is obtained, the telephone station controller 106 goes to step S1010.

In step S1014, the telephone station controller 106 searches the directory entry for an account number. If the directory entry contains the account number, the telephone station controller 106 goes to step S1010. Otherwise, the telephone station controller 106 goes to step S1016. In step S1016, the telephone station controller 106 dials the number of the remote party and goes to step S1012.

In step S1010, the telephone station controller 106 forms a number using the telephone number, the account number and control codes that invoke the accounting features of the central switch 90 for charging a call to an account number. The telephone station controller 106 dials the number and the central switch 90 establishes the connection to the remote party and charges the account number for the call. Then, the telephone station controller goes to step S1012 and ends the account number voice command process.

The telephone station controller 106, the controller memory 108 and the directory memory 308 may be embodied in hardware using dedicated components. Application specific integrated circuits (ASIC) may also be used for each of the components listed above. Portions of each component may be combined into different ASICs for optimum performance characteristics.

If the voice recognition controller 110 is a high powered processor such as a digital signal processor (DSP), the complete telephone station controller 106 may be implemented together with the voice recognition controller 110 as programs executed by the digital signal processor.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A dialing device for a telephone station, the telephone station calling a remote party by dialing a resultant number comprising a telephone number and an account number in response to at least one input received from a user, wherein none of the at least one input includes the account number, the dialing device comprising:

a user interface device;

a directory memory; and a controller coupled to the directory memory and the user interface device, the controller fetching the account number from a first directory entry in the directory memory, determining whether the first entry also contains the telephone number, requesting the user to provide a second input if the first entry does not contain the telephone number, and forming the resultant number from the telephone number and the account number, at least the account number being fetched from the directory memory in response to the at least one input received from the user through the user interface device, and dialing the resultant number.

2. The device of claim 1, wherein the controller fetches the telephone number and the account number of an account to be charged from the directory memory when a first input of the at least one input is a name of the remote party, the controller forming the resultant number using the account number, the telephone number and control codes, the control codes invoking accounting features of a switch connected to the telephone station.

3. The device of claim 2, wherein the user interface device comprises a microphone, the microphone generating a first voice print corresponding to the first input of the name of the remote party.

4. The device of claim 1, wherein the controller fetches the account number from the directory memory when a first input of the at least one input corresponds to an account name of an account to be charged and obtains a telephone number corresponding to a second input of the at least one input, the controller forming the resultant number using the account number, the telephone number and control codes, the control codes invoking accounting features of a switch connected to the telephone station.

5. The device of claim 4, wherein the user interface device comprises a microphone, the microphone generating a voice print corresponding to the first input of the account name, the controller fetching from the directory memory the account number corresponding to the voice print generated by the microphone.

6. The device of claim 5, wherein:

the user interface device comprises a keypad, the second input being one of a voice print generated in response to the user speaking into the microphone and the telephone number generated in response to the user pushing keys of the keypad, and when the voice print is generated, the controller fetches from the directory memory the telephone number corresponding to the voice print.

7. A dialing method for a telephone station to call a remote party by dialing a resultant number comprising a telephone number and an account number in response to at least one input received from a user, wherein none of the at least one input includes the account number, the method comprising:

fetching at least the account number from a first entry in a directory memory in response to the at least one input received from the user;

determining whether the first entry contains the telephone number;

requesting the user to provide a second input if the first entry does not contain the telephone number;

forming the resultant number using the telephone number and the account number fetched from the directory memory;

and dialing the resultant number.

8. The method of claim 7, wherein fetching at least the account number comprises:

fetching the telephone number and the account number of an account to be charged from the directory memory when a first input of the at least one input corresponds to a name of the remote party.

9. The method of claim 8, wherein the resultant number is formed using the account number, the telephone number and control codes, the control codes invoking accounting features of a switch connected to the telephone station.

10. The method of claim 7, wherein fetching at least the account number comprises:

fetching the account number from the directory memory when a first input of the at least one input corresponds to an account name of an account to be charged; and obtaining the telephone number corresponding to a second input of the at least one input.

11. The method of claim 10, wherein fetching the account number comprises:

generating a voice print using a microphone of the user interface device, the voice print corresponding to the first input of the account name; and fetching from the directory memory the account number corresponding to the voice print generated by the microphone.

12. The method of claim 10, wherein obtaining the telephone number comprises:

generating a voice print using a microphone of the user interface device, the voice print corresponding to the second input of the at least one input; and fetching from the directory memory the telephone number corresponding to the second input.

13. The method of claim 10, wherein obtaining the telephone number comprises:

generating the telephone number using a keypad of the user interface device, the telephone number being generated in response to a user pushing keys of the keypad.

14. A dialing device for a telephone station to call a remote station by dialing a resultant number comprising a telephone number to be called and an account number to be billed, the dialing device comprising:

- a user interface device for inputting from a user a first input that does not include the account number to be billed;
- a directory memory comprising a plurality of memory entries,
  - the plurality of memory entries together comprising a plurality of account numbers including the account number to be billed,
  - each respective entry of the plurality of memory entries comprising a respective one of the plurality of account numbers; and
- a controller coupled to the directory memory and the user interface device, the controller comprising:
  - means for locating, based on the first input, a first entry from among the plurality of memory entries;
  - means for retrieving the account number to be billed from the first entry;
  - means for retrieving the telephone number to be called;
  - means for forming the resultant number from the retrieved telephone number and the account number retrieved from the first entry;
  - determining means for determining whether the first entry contains the telephone number to be called;
  - requesting means for requesting the user to provide a second input if the determining means determines that the first entry does not contain the telephone number to be called; and
  - means for dialing the resultant number.

15. The dialing device of claim 14, wherein the second input identifies one of (a) the telephone number to be called and (b) a second entry comprising the telephone number to be called.

16. The dialing device of claim 15, wherein the requesting means comprises voice simulation means for verbally communicating with the user.

17. The dialing device of claim 14, wherein the user interface device comprises voice recognition means including means for transforming a spoken input to a voice print.

18. The dialing device of claim 14, wherein
- the requesting means comprises voice simulation means for outputting spoken inquiries of the user; and
- the controller further comprises
  - means for controlling the voice simulation means to verbally request the user to provide a second input if the determining means determines that the first entry does not contain the telephone number to be called.

19. The dialing device of claim 18, wherein the second input identifies one of the telephone number to be called and a second entry comprising the telephone number to be called.

20. The dialing device of claim 14, further comprising:
- a microphone for entry of a spoken input; and
- means for transforming the spoken input to a corresponding voice print.

21. A dialing method for generating and dialing a resultant number to call a remote station, the resultant number comprising a telephone number of the remote station to be called and an account number to be billed, the method comprising:

- receiving a first user-supplied input that does not include the account number to be billed;
- locating, based on the first user-supplied input, a first directory entry of a directory memory;
- retrieving the account number to be billed from the first directory entry after the first directory entry has been located based on the first user-supplied input;
- determining whether the first directory entry includes the telephone number of the remote station to be called;
- issuing a request to the user to input a second user-supplied input that corresponds to the remote station to be called if the first directory entry does not contain the telephone number of the remote station to be called;
- generating a resultant number from the telephone number to be called and the retrieved account number to be billed; and
- dialing the resultant number.

22. The dialing method of claim 21, further comprising:

receiving the second user-supplied input from the user;

locating a second directory entry of the directory memory, based on the second user-supplied input, the second directory entry containing information concerning the remote station including the telephone number associated with the remote station; and retrieving the telephone number from the second directory entry.

23. The dialing method of claim 22, wherein the first and second user-supplied inputs are first and second spoken inputs, respectively, input via a microphone, the method further including transforming the first and second spoken inputs to corresponding first and second voice prints for respectively locating the first and second directory entries.

\* \* \* \* \*